Patented Sept. 15, 1925.

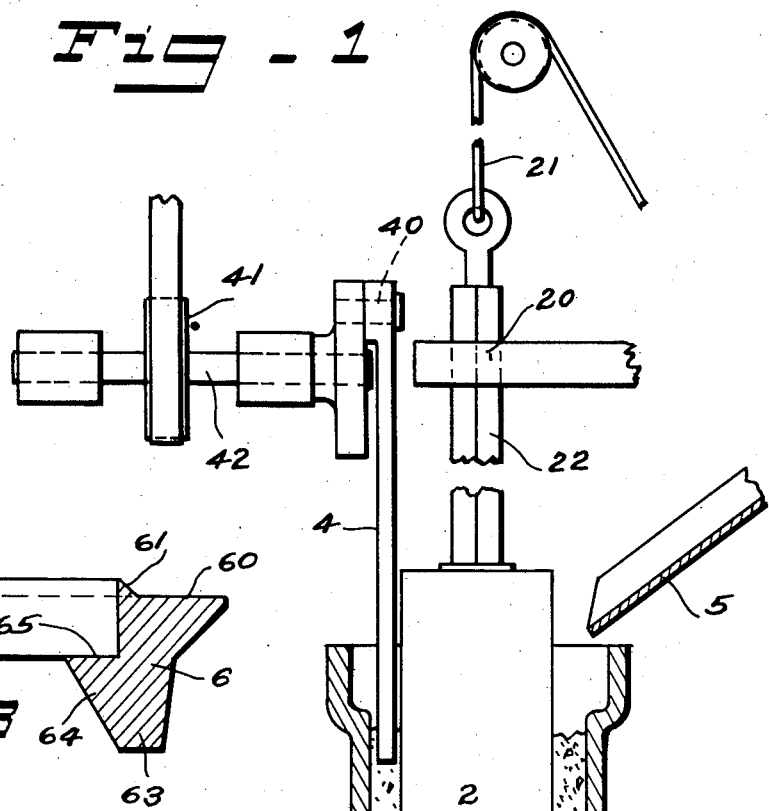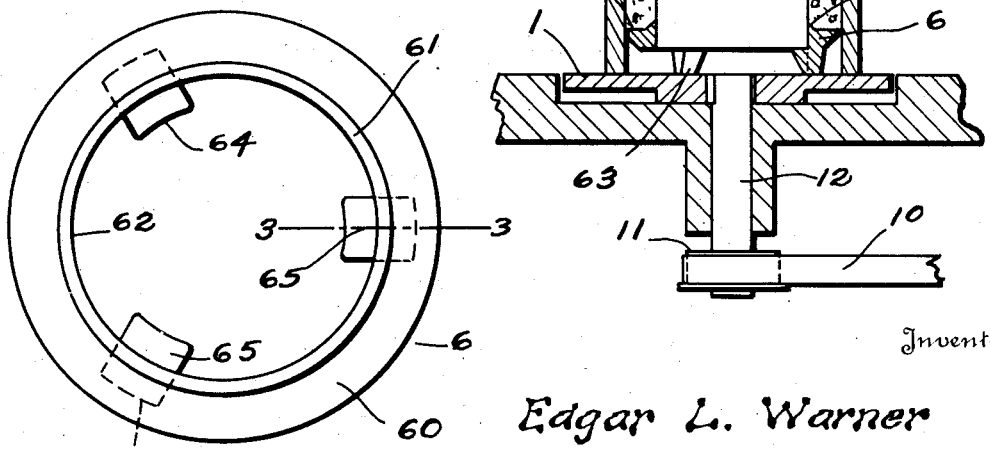

1,553,842

UNITED STATES PATENT OFFICE.

EDGAR L. WARNER, OF SEATTLE, WASHINGTON, ASSIGNOR TO CONCRETE PIPE COMPANY, OF SEATTLE, WASHINGTON, A CORPORATION OF WASHINGTON.

MACHINE FOR MOLDING CONCRETE PIPE.

Application filed June 26, 1924. Serial No. 722,449.

*To all whom it may concern:*

Be it known that I, EDGAR L. WARNER, a citizen of the United States of America, and resident of the city of Seattle, in the county of King and State of Washington, have invented certain new and useful Improvements in Machines for Molding Concrete Pipe, of which the following is a specification.

My invention relates to an improvement in the art of molding pipe and the like, particularly concrete pipe, such as is employed for sewers and drains.

Sewer pipe prepared by methods and equipment heretofore ordinarily in use, has come from the mold with a roughened edge projecting inwardly at the inside of the small end of belled pipe, and as the roughened edge interrupts the otherwise smooth interior of the pipe and was liable to form such an obstruction as would catch straws and other debris, consequently fouling and finally obstructing the pipe, it has been necessary heretofore to ream out this edge of the pipe and to smooth down the roughened edge formed thereon. This required considerable time and labor and it is one of the objects of my present invention to avoid the necessity for such reaming or smoothing operations.

An important object, then, is the provision of a novel combination of pipe molding machinery, including a novel pallet, which will form the pipe complete and ready for use without further operations thereon.

A further object is the provision of means whereby the pipe may be molded with a chamfer or like space to receive the sealing cement which is forced into the pipe and which must be smoothed or swabbed down after the pipe is set.

Inasmuch as the investment in pallets in a concrete pipe plant is considerable and their aggregate weight and bulk is large, it is my object to cut down the size of the pallet and its weight, and consequently reduce the investment necessary to be made in such pallets.

A further object is the provision of such a pallet for use in pipe molding machinery, which is provided with means to prevent tilting of the pallet after it is placed upon the turntable and while the core is being positioned with respect thereto, and in this manner to prevent the formation of pipe with ends inclined other than at right angles to its axis.

My invention comprises the novel pallet and the novel combination of molding machinery including the same, as shown in the accompanying drawings, described in this specification and particularly defined by the claims terminating the same.

Figure 1 is a section through the essential portions of the pipe-molding machinery, showing an embodiment of my invention.

Figure 2 is a plan view of my novel pallet, and Figure 3 is a section on line 3—3 of Figure 2.

As is common in such pipe-molding machinery, I employ a turntable 1 which is suitably rotated, as by a belt 10 running over a pulley 11, the pulley and turntable being secured upon a common shaft 12. Above the turntable is suspended a core 2, this being generally cylindrical and preferably being supported from a square rod 22, suspended as by a rope 21, the square rod 22 passing through a correspondingly shaped aperture in a bracket 20. By such means the core may be kept from rotation, although in certain aspects of my invention it is not essential that the core be nonrotative. The form 3 is positioned about the core 2 and preferably rests upon and rotates with the turntable 1. It will be understood that these members are common in the art and may assume any form therein not incompatible with the use of my improved pallet, to be described hereinafter. Also it is common in such machinery to provide a tamp stick 4 reciprocable in the space between the form 3 and core 2, to pack the concrete entering through the chute 5. The tamp stick may be operated through a crank 40 rotatable by means of a pulley 41 secured upon a common shaft 42, or in any other suitable manner.

Filling the space between the bottom of the form 3 and core 2 is a pallet, generally designated by the numeral 6. Ordinarily such pallets have a plane upper surface and the end of the core 2 rests upon this upper surface. While the upper surface 60 of my pallet is, in general, plane, yet it is formed with means at its inner periphery for forming upon the molded pipe a chamfer, which is taken out of the inner lower edge of the pipe. For this purpose a bead 61 may be formed at the inner periphery of the ring-like pallet 6, this bead extending above the general plane of the pallet and preferably being inclined upwardly and inwardly to form a sharp upper edge above the general plane represented by the surface 60 of the pallet and of a radius corresponding to the central aperture 62 of the pallet.

The central aperture of the pallet is of a diameter corresponding to the diameter of the core 2, at least of its lower end, and the core thus is fitted within the aperture 62 and does not rest upon the surface of the pallet. Thus the upper edge of the bead 61 lies immediately adjacent the peripheral surface of the core 2, above its end. Material entering the form will be forced outwardly by the bead 61, but if a thin film should form between the bead 61 and the core 2, this thin film in any event extends longitudinally of the pipe and thus does not form an inwardly projecting roughened ledge, but also in knocking loose the pallet, as is necessary in any event after the concrete of the pipe has set, this thin film will be knocked loose and removed. The inner lower edge of the pipe thus is self-cleansing and is formed with a chamfer which when the pipe is set in place may receive the cement which is smoothed or swabbed down from the inside, thus additionally serving to maintain the inside surface of the sewer smooth and unobstructed, and nonleaking.

The pallet is generally supported upon feet 63, which support the rear of the pallet slightly above the surface of the turntable. If it should happen in lowering the core 2 that it should strike the bead 61 at one side, instead of entering the aperture 62, this might tend to tilt the pallet, and in order to avoid this I have provided a plurality of lugs 64 likewise spaced angularly about the central aperture 62 and projecting thereinto, which are adapted to be engaged by the side of the core 2 opposite that which engages the bead 61, and thus further downward pressure of the core 2 will return the pallet to its normal level position and cause it to center itself. Such devices are unnecessary with present pallets, inasmuch as the core now rests upon the pallet itself. When in final operative position, the core 2 has its lower end at about the level of the upper surfaces of shoulders 65 of the lugs 64, although preferably it does not rest thereupon. These shoulders 65 merely serve to maintain the pallet level by preventing tilting relative to the core 2.

By forming the pallet only of a width to fit between the core and form, rather than of a width to extend beneath the core, its width is considerably reduced, and its weight and cost are correspondingly decreased. This effects a considerable saving in large plants. The saving of time required to finish the pipes after removing them from the molds, by eliminating the necessity for reaming their inner edges, also effects a large saving.

What I claim as my invention is:

1. In machinery for molding pipe, a turntable, an axially apertured pallet adapted to rest thereon, a core axially positioned relative to the turntable and pallet, its lower end being receivable within the aperture of the pallet to be closely embraced thereby, a form surrounding said core and said pallet, angularly spaced feet supporting said pallet, and angularly spaced positioning lugs thereon projecting within the central aperture of the pallet, and positioned immediately beneath the lower end of the core when the latter is in operative position.

2. In machinery for molding pipe, a turntable, an axially apertured pallet adapted to rest thereon, a core axially positioned relative to the turntable and pallet, its lower end being receivable within the aperture of the pallet to be closely embraced thereby, a form surrounding said core and said pallet, angularly spaced feet supporting said pallet, and angularly spaced positioning lugs thereon projecting within the central aperture of the pallet, and postioned immediately beneath the lower end of the core when the latter is in operative position, and an upwardly and inwardly inclined bead formed upon said pallet at its inner periphery.

3. A pallet for use in molding pipe comprising a ring of a width corresponding to the thickness of the pipe wall, angularly spaced supporting feet beneath said pallet, and positioning lugs projecting within the central aperture of the pallet and beneath its upper surface.

4. A pallet for use in molding pipe comprising a ring of a width corresponding to the thickness of the pipe wall, and having a generally plane upper surface, a bead about its central aperture inclined inwardly and upwardly to terminate in a sharp edge above the surface of the pallet and coinciding in radius with its aperture, angularly spaced supporting feet beneath the pallet, and angularly spaced positioning lugs projecting within the central aperture and lying beneath the upper edge of said bead.

Signed at Seattle, King County, Washington, this 11th day of June, 1924.

EDGAR L. WARNER.